June 11, 1963 T. R. BOYD 3,093,178
RETAINER FASTENER
Filed Feb. 5, 1959
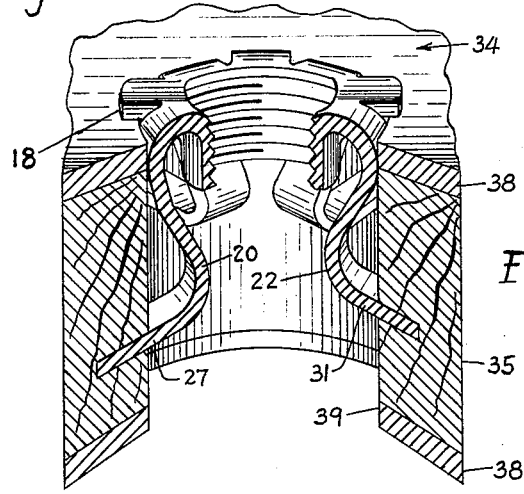
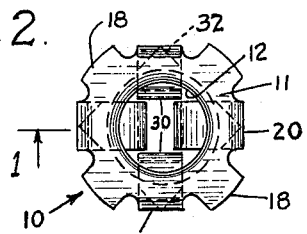
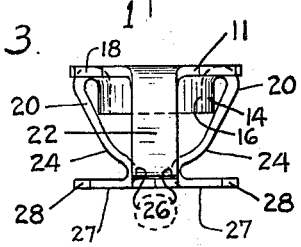
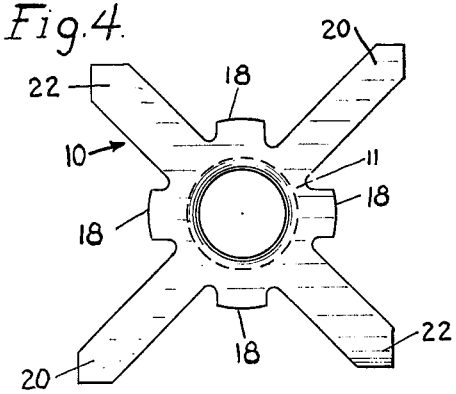
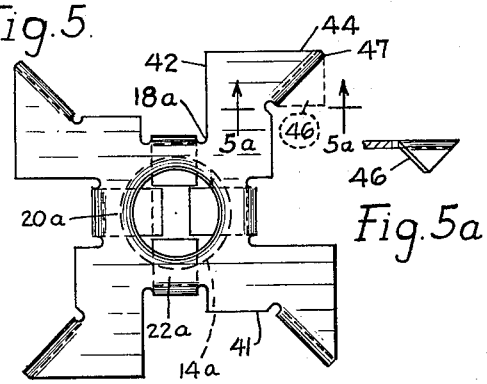
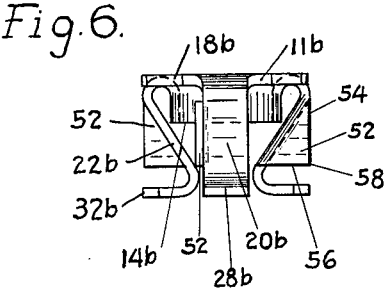
INVENTOR.
Thomas R. Boyd
BY
Robert W. Beart
HIS ATTORNEY.

United States Patent Office 3,093,178
Patented June 11, 1963

3,093,178
RETAINER FASTENER
Thomas R. Boyd, Rolling Hills Estates, Calif., assignor to Illinois Tool Works, Inc., Chicago, Ill., a corporation of Delaware
Filed Feb. 5, 1959, Ser. No. 791,346
3 Claims. (Cl. 151—41.73)

This invention relates to a sheet metal fastener. More particularly, the invention contemplates a device which performs as a self-retained nut member.

In the field of aircraft, present developments lead in the direction of lightweight multi-celled panels which are formed like honeycomb and which are covered by and attached to a pair of parallel continuous sheets of thin material. This produces a lightweight rigid panel well known in the art. A basic problem exists in the fastening of such honeycomb panels to structural members. In instances known to applicant, the honeycomb panels are provided with a border of soft wood or foamlike material for the acceptance of fasteners to attach the panels to structural members.

An object of this invention is to provide an inexpensive lightweight sheet metal nut member which will be self-retained in a panel of relatively soft material for subsequent acceptance of a screw threaded member.

A further object is to provide a sheet metal nut member which will in mounted position be nonrotatably retained relative to a honeycomb panel and which will accommodate a screw threaded member.

Other more specific objects of this invention will be brought out in the descriptive material hereinbelow when taken in combination with the accompanying drawings wherein:

FIG. 1 is a sectional perspective view of an embodiment of this invention shown in applied form in a panel member;

FIG. 2 is a plan view of the same embodiment of the invention shown in FIG. 1;

FIG. 3 is a view in elevation of the embodiment disclosed in FIGS. 1 and 2;

FIG. 4 shows the blank layout of the embodiment of the invention disclosed in FIGS. 1 thru 3a;

FIG. 5 discloses a modification of the embodiment of the invention shown in FIGS. 1 thru 3a;

FIG. 5a is a sectional view taken along lines 5a—5a of FIG. 5; and

FIG. 6 discloses a further modified form of the invention.

Referring now to the drawings and, particularly, to FIGS. 2, 3 and 4, the preferred embodiment of this invention is generally designated by the numeral 10. This sheet metal nut member includes a substantially planar head member 11 provided with a screw accommodating aperture 12. If desired, the aperture 12 may be formed by piercing and the material from the hole extruded to form a sleeve or tubular body member 14 which can be tapped as at 16 and thereby adapted to accept a complementary threaded screw member 13. Extending radially from head portion 11 and peripherally spaced thereabout are a plurality of tabs 18. In the present instance, tabs 18 are 4 in number and equi-spaced about the periphery of the head. Referring more particularly now to FIG. 4, the fastener 10 in a blank form is cruciform in shape with the tabs 18 being positioned intermediate the fingers 20 and 22. One pair of fingers 20, being opposite each other, are substantially greater in radial extent than the other pair of opposed fingers 22 for reasons set forth hereinafter.

The fingers 20 and 22 comprise the shank of the fastener and normally extend radially outwardly a distance less than the tabs 18. They are bent downwardly from their juncture with the head portion 11 and inwardly towards the axis of the fastener with their terminal end portions 27 and 31 respectively being bent outwardly generally normal to the axis of the fastener. In the case of the longer pair of fingers designated 20, the additional material is bent as at 24 to further underlie the tubular body member 14 before being bent radially outwardly as at 26. As can best be seen in FIG. 2, the reverse bends 26 of fingers 20 lie in closer relationship to one another than do the reverse bent portions 30 of fingers 22. The purpose of this is described later. The extremity of legs 20 and 22 are pointed as at 28 and 32 respectively with the tips of said points lying on a circle which is co-axial with the fastener axis.

A workpiece 34 of the type in which this fastener can be advantageously employed includes a soft core 35 and external sheathing 38 laminated to said core with an aperture 39 extending through the workpiece 34. In use, the fastener 10 is axially telescoped into the aperture until the tabs 18 rest on an outer surface of the sheathing 38 on one side of the panel 34. A complementary member is inserted through the aperture 12 and axially extended through the fastener. Such a member can be an unthreaded cylindrical tool or a screw threaded member. The axial traversing of the fastener by such a member forces the fingers 20 and 22 of the shank portion radially outwardly whereby the pointed terminal ends 28 and 32 respectively are caused to dig into the core material 35 whereby the fastener is axially and rotationally retained relative to the workpiece 34. It must be noted that because of the differing blank lengths of fingers 20 and 22, the radius of curvature, measured from the juncture of the respective fingers with the head portion 11, will position the terminal ends 27 and 31 in different planes relative to the axis of the fastener and the aperture in the workpiece. This is accentuated in FIG. 1 for clarity of presentation. The end or applied position of terminal ends 27 and 31 in different planes reduces the possibility of tracking by the points 28 and 32 respectively if the fastener should inadvertently rotate in the workpiece. It also reduces the possibilities of splitting the core material during installation of the fastener.

A modification to the preferred embodiment is shown in FIGS. 5 and 5a wherein similar parts are identified by similar numerals with the addition of the suffix "a". The tabs 18a are provided with a substantially L shape extension 41. One leg 42 of the L extending from each tab 18a is positioned substantially parallel to the next adjacent finger to the left as viewed in the drawing, with the second leg 44 extending substantially normal to the first leg and parallel to the next adjacent finger to the right, again as seen in the drawing. The L-shaped extension 41 is of substantial width as compared to the thickness of the material and has one corner 46 of leg 44 bent downwardly on the bias to provide a depending tab 46 located in a plane which is generally radial to the axis of the fastener and perpendicular to the rotation of a complementary screw.

This modified form of the invention is desirable in situations where the workpiece is relatively thin or exceptionally soft and requires a greater bearing area over its external surface. In addition, the device shown in FIG. 5 can be inserted in the aperture of a workpiece and the prong 46 driven into the outer surface. This permits the use of a screw threaded member to be used to accomplish the radial expansion of fingers 20a and 22a since the fastener is rotationally fixed relative to the workpiece by the tabs 46. Once the terminal ends of legs 22 and 22a respectively are radially engaged with the workpiece, the tabs 46 serve a secondary function in that they permit the fastener to withstand larger torque loads applied to the complementary screw threaded member.

A second modification to the invention is shown in the device seen in FIG. 6 wherein similar numerals are utilized to identify similar parts with the addition of the suffix "b." This embodiment of the invention includes the head portion 11b, depending tubular body member 14b, tabs 18b and legs 20b and 22b having pointed terminal ends 28b and 32b respectively.

Along one edge of each finger 20b and 22b, there is provided a generally radially extending wedge shaped flange 52 having an outer edge 54 substantially parallel to the axis of the fastener and a lower edge 56 substantially normal to the axis of the fastener, the intersection of these two edges forming a sharp point 58. When a complementary member is axially telecoped with the tubular portion 14b, the radial distortion of fingers 20b and 22b force the point 58 and the major portion of the body of each flange 52 radially into the core of the workpiece. The flanges 52 positioned in generally vertical planes materially assist the fastener in withstanding high torque loads applied through a complementary screw threaded member. In addition, the flanges 52 act as stabilizing fins during the insertion of the fastener into a workpiece aperture and generally prevent cocking of the fastener axis relative to the aperture axis. The terminal end portions of the fingers 20b and 22b being positioned in a substantially horizontal plane serve the function of withstanding tensile forces applied to the fastener in the same fashion as the other embodiments of the invention.

Thus, this invention contemplates an inexpensive self-retained nut which is nonrotatable and concentric relative to a workpiece aperture, such as in a honeycomb panel. Other modifications which come within the scope of the basic invention will be apparent to those skilled in the art, the invention being contemplated by the appended claims which follows.

The invention is claimed as follows:

1. A one-piece self-retaining sheet metal nut fastener made from material of substantially uniform thickness which is adapted to be telescopically assembled within a complementary bore in a workpiece, said fastener formed from a double cruciform blank and including a planar head member having a centrally located aperture, a depending open ended tubular body member surrounding said aperture which is integral with said head and drawn from the blank forming said head, said body member provided with internal thread engaging means suitable for accepting a complementary screw threaded member to be passed therethrough, two pairs of opposed tabs arranged in quadrature which are integral with said head and emanating therefrom in a radial and co-planar fashion and providing shoulders on said head which determine the depth to which said fastener may be inserted into the complementary bore in a workpiece, two pairs of opposed elongated fingers arranged in quadrature which have a bendable junction integral with the peripheral margin of said head and positioned intermediate adjacent pairs of the aforementioned tabs, each said bendable junction being an equal radial distance from the body axis, one pair of fingers being of greater radial length in the blank than the other pair of fingers, said first pair of fingers being initially formed downwardly and inwardly from their bendable junction with said head and axially beyond said threaded body member thence being bent inwardly again under said threaded body member until said first pair of fingers are in close and opposed proximity to each other at which point each finger is reversely bent outwardly to provide terminal finger portions extending substantially along a plane normal to the axis of the fastener, said second pair of fingers being bent downwardly and inwardly from their bendable juncture with said head member towards the free end of said body member and extended until they substantially abut the marginal edges of said first pair of fingers thence bent outwardly to provide terminal finger portions extending substantially along the same plane as the said first pair of fingers, all of said fingers terminating in a point with all points falling on an imaginary circle concentric with and of a greater diameter than said threaded body member, and each point of each of said fingers extended radially outward a radial distance substantially equal to the radial distance that the bendable juncture of each of said fingers extends from the axis of the fastener shank portion, said terminal finger portions of said first fingers having a greater radial length than said terminal finger portions of said second fingers, said fastener shank portion adapted to extend into said bore to a depth as determined by said tabs, said finger portions in the vicinity of the juncture of those portions in the common plane and their adjacent reversely bent portions being spaced apart a distance substantially smaller than the diameter of the threaded body member and the complementary screw member with which it cooperates to assure that as the complementary screw is inserted and moved axially through said fastener shank portion that said fingers are forced laterally into the material of the workpiece forming the wall of said bore with the points on the terminal portions of said two pairs of said fingers assuming an imbedded position in two different planes which are normal to the axis of the fastener and which occurs because of the different lengths of the terminal portions of each of said two pairs of said fingers being moved radially outwardly different radial measurements from their initial position in a common plane normal to the fastener axis.

2. A fastener of the type disclosed in claim 1 wherein said tabs are provided with extensions, the free ends of said extensions being bent on the bias to provide depending points which will dig into the surface of a workpiece.

3. A fastener of the type disclosed in claim 1 wherein the bend lines forming the points are angularly disposed relative to the tangent of an imaginary circle passing through the innermost corner of each of the extensions at the bend lines whereby said points will aggressively resist rotation of the fastener when embedded in the surface of a workpiece and will not track one another.

References Cited in the file of this patent

UNITED STATES PATENTS

| | | |
|---|---|---|
| 1,373,645 | Bandoly | Apr. 5, 1921 |
| 1,881,973 | Schmitt | Oct. 11, 1932 |
| 1,889,139 | Bebie | Nov. 29, 1932 |
| 2,018,251 | Croessant | Oct. 22, 1935 |
| 2,356,934 | Ketcham | Aug. 29, 1944 |
| 2,370,327 | Rosan | Feb. 27, 1945 |
| 2,404,372 | Hallock | July 23, 1946 |
| 2,555,420 | Richardson | June 5, 1951 |
| 2,561,433 | Uhle | July 24, 1951 |
| 2,588,860 | Marks | Mar. 11, 1952 |
| 2,591,575 | McCollum | Apr. 1, 1952 |
| 2,823,572 | Gisondi | Feb. 18, 1958 |

FOREIGN PATENTS

| | | |
|---|---|---|
| 331,334 | Great Britain | July 3, 1930 |
| 1,018,678 | France | Oct. 15, 1952 |
| 161,023 | Sweden | Oct. 22, 1957 |